J. E. LAPPEN.
FIRELESS COOKER.
APPLICATION FILED APR. 21, 1911.
1,122,131.
Patented Dec. 22, 1914.
2 SHEETS—SHEET 1.
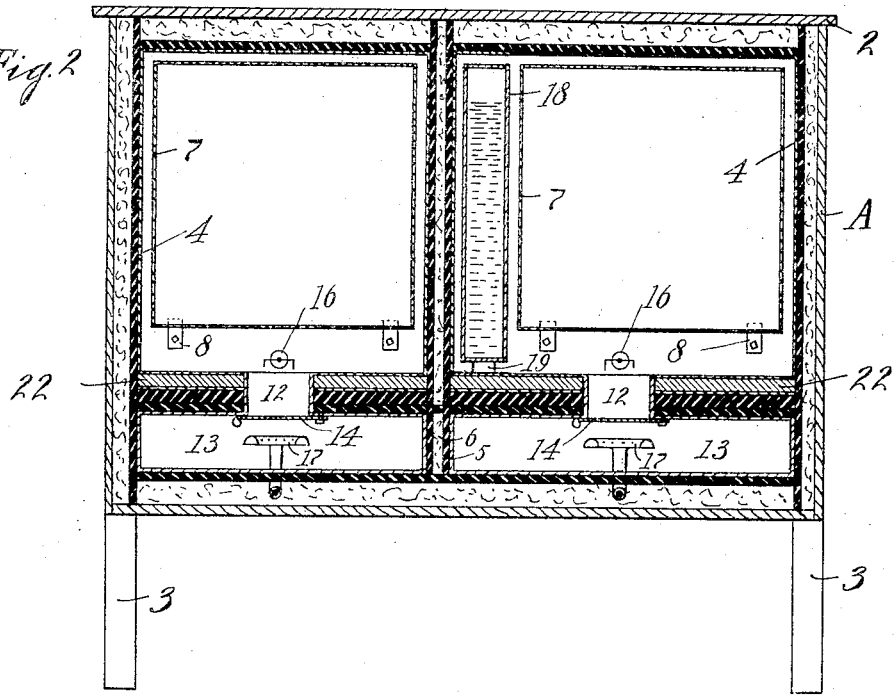
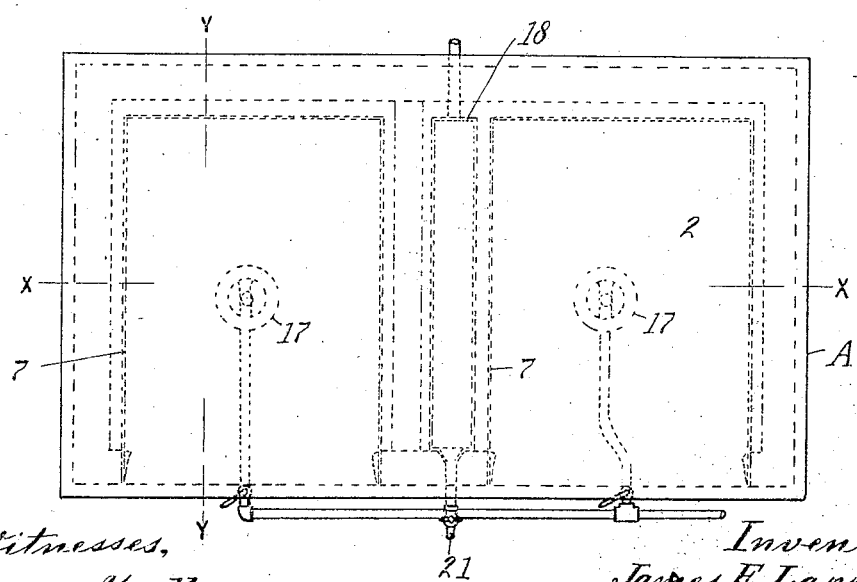
Witnesses,
George Voelker
H. Smith
Inventor,
James E. Lappen
by Lothrop & Johnson
his Attorneys J. E. LAPPEN.
FIRELESS COOKER.
APPLICATION FILED APR. 21, 1911.
1,122,131.
Patented Dec. 22, 1914.
2 SHEETS—SHEET 2.
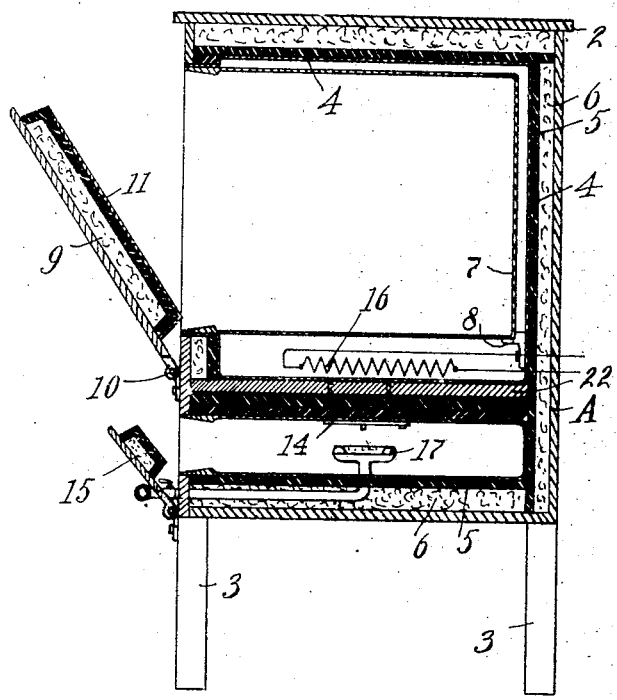
Fig. 3
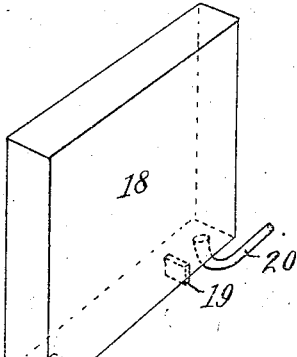
Fig. 4
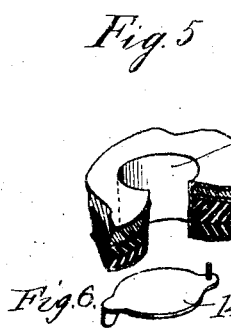
Fig. 5
Fig. 6
Witnesses,
George Voelker
H. Smith
Inventor,
James E. Lappen
by Lothrop & Johnson
his Attorneys.

UNITED STATES PATENT OFFICE.

JAMES E. LAPPEN, OF WINONA, MINNESOTA, ASSIGNOR TO UNION FIBRE COMPANY, OF WINONA, MINNESOTA, A CORPORATION.

FIRELESS COOKER.

1,122,131.  Specification of Letters Patent.  Patented Dec. 22, 1914.

Application filed April 21, 1911. Serial No. 622,464.

*To all whom it may concern:*

Be it known that I, JAMES E. LAPPEN, a citizen of the United States, residing at Winona, in the county of Winona and State of Minnesota, have invented certain new and useful Improvements in Fireless Cookers, of which the following is a specification.

My invention relates to improvements in cooking apparatus, its object being particularly to provide a combination range and fireless cooker wherein artificial heat can be utilized to do the preliminary cooking in the most economical and efficient manner, and wherein all the advantages of a fireless cooker are present in high degree.

To this end my invention consists in the construction, combination and arrangement of parts hereinafter described and claimed.

In the accompanying drawings forming part of this specification, Figure 1 is a plan view of my improved apparatus; Fig. 2 is a section on line x—x of Fig. 1; Fig. 3 is a section on line y—y of Fig. 1; Fig. 4 is a perspective view of the water heater forming part of my invention; Fig. 5 is a perspective view of a fragment of one of the bottom insulating walls of the apparatus and Fig. 6 is a detail of a damper forming part of my invention.

Referring to the drawings, A represents the outside casing of the apparatus, 2 its flat top which is adapted to be used as a table, and 3 its supporting legs. Within the casing is shown arranged a pair of chambers 4 having sheet metal walls separated from each other and from the walls of the casing by suitable insulating linings 5 and 6. Within the chambers and spaced apart from the walls thereof are sheet metal ovens 7 supported upon suitable brackets 8. The ovens open through the front of the casing and may be closed by doors 9 having hinge supports 10 on the casing below the oven, said doors being formed with an insulated metal face 11 to fit into the open front of the oven, as shown in Fig. 3. Below the chambers 4 and connected therewith by passages 12 are the metal lined chambers 13, insulating linings 5 and 6 being arranged between the chambers 13 and the walls of the casing and between the chambers 13 and the chambers 4. The passages 12 may be closed by dampers 14. The chambers 13 open through the front of the casing and may be closed by hinged doors 15 similar to the oven doors 9. In the bottom of the chambers 4 I arrange plates 22 of stone or suitable material to store heat and assist in the efficient operation of the apparatus.

The ovens are adapted to be heated either by the electrical devices 16 supported immediately underneath the bottoms of the ovens or by the gas burners 17 supported in the chambers 13 below the openings 12. It will be understood that the electrical devices will be connected with a source of energy and the gas burners to a suitable source of fuel supply.

In order to utilize the heat within the apparatus to heat water, I provide a water chamber 18 supported between one side of one oven and the adjacent side wall of the chamber 4, the water chamber being supported upon brackets 19 so as to form a space between it and the surrounding inner wall, the water chamber being connected with a suitable source of supply by means of a pipe 20 and provided with a discharge faucet 21.

Where the apparatus is heated electrically the dampers 14 are closed, as indicated in Fig. 2, retaining the heated air within the spaces around the ovens. Where instead of using the electrical apparatus I use the burners 17, the dampers 14 are opened to allow the heated air to pass through the openings 12 into the spaces around the ovens.

In using my apparatus the cooking of the articles of food within the oven is begun by the heat supplied from the electrical devices 16 or by the burners 17. When it is desired to stop the preliminary cooking and allow the apparatus to be used as a fireless cooker to complete the cooking, the current will be turned off from the electrical devices 16, or the fuel supply shut off from the burners, as the case may be. The heated air around the ovens and the stored heat in the plates 22 will then complete the process of slowly cooking the articles in the ovens.

As will be evident I can use either of the ovens separately, the two ovens being completely insulated from each other.

By having a combined range and fireless cooker constructed as described I am enabled to have the top of the apparatus serve as a table, making the apparatus more convenient in use.

I claim as my invention:

1. A combined range and fireless cooker, comprising in combination, a surrounding insulating casing forming a unitary structure, metallic chambers superimposed in said structure and being separated by insulating material, a heat-absorbing element also between said chambers and coinciding with said insulating material, a dampered passage piercing said insulating material and heat-absorbing element and connecting said chambers, a heat source in one chamber and registering with said passage, and an oven mounted in the other chamber and communicating with the atmosphere through one side.

2. A combined range and fireless cooker, comprising in combination, a surrounding insulating casing forming a unitary structure, metallic chambers superimposed in said structure and being separated by insulating material, a heat-absorbing element also between said chambers and coinciding with said insulating material, a dampered passage piercing said insulating material and heat-absorbing element and connecting said chambers, a heat source in one chamber and registering with said passage, an oven mounted in the other chamber and communicating with the atmosphere through its side, and a water-heater occupying said other chamber with said oven, said oven and water-heater being separated from one another and from the walls of the chamber by air-spaces.

In testimony whereof I affix my signature in presence of two witnesses.

JAMES E. LAPPEN.

Witnesses:
L. F. GIFFORD,
S. E. McCARL.